(12) United States Patent
Choung

(10) Patent No.: US 10,125,650 B1
(45) Date of Patent: Nov. 13, 2018

(54) EXHAUST GAS PURIFICATION APPARATUS

(71) Applicants: Hyundai Motor Company, Seoul (KR); Kia Motors Corporation, Seoul (KR)

(72) Inventor: Jin Woo Choung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/836,204

(22) Filed: Dec. 8, 2017

(30) Foreign Application Priority Data

Oct. 26, 2017 (KR) .................. 10-2017-0140013

(51) Int. Cl.
*F01N 3/28* (2006.01)
*F01N 3/10* (2006.01)
*B01D 53/94* (2006.01)

(52) U.S. Cl.
CPC ......... *F01N 3/2803* (2013.01); *B01D 53/944* (2013.01); *F01N 3/101* (2013.01); *B01D 2255/102* (2013.01); *B01D 2255/9025* (2013.01)

(58) Field of Classification Search
CPC . F01N 3/101; F01N 3/2803; B01D 2255/102; B01D 2255/9025

USPC .................. 422/168, 177; 502/230
See application file for complete search history.

(56) References Cited

U.S. PATENT DOCUMENTS

| | | | | |
|---|---|---|---|---|
| 6,617,276 B1* | 9/2003 | Ballinger | ............ | B01D 53/944 502/66 |
| 7,758,834 B2* | 7/2010 | Chen | .................... | B01D 53/945 423/213.2 |
| 7,811,962 B2 | 10/2010 | Hu et al. | | |
| 8,968,690 B2 | 3/2015 | Nunan et al. | | |
| 2014/0113807 A1* | 4/2014 | Segawa | ................ | B01J 37/0244 502/242 |
| 2014/0357480 A1* | 12/2014 | Aoki | .................... | B01J 37/0244 502/304 |

FOREIGN PATENT DOCUMENTS

JP        2008240622 A     10/2008

* cited by examiner

*Primary Examiner* — Tom P Duong
(74) *Attorney, Agent, or Firm* — Slater Matsil, LLP

(57) ABSTRACT

An engine exhaust gas purification apparatus includes a three way catalyst disposed on an exhaust line, and which transforms harmful materials in exhaust gas to harmless materials by an oxidation-reduction reaction. The three way catalyst includes a first catalyst layer, a second catalyst layer, and a third catalyst layer laminated from an upper portion on a cordierite carrier, and the first catalyst layer comprises at least one platinum group metal and an oxygen non-storage material.

22 Claims, 7 Drawing Sheets

(a)  (b)  (c)  (d)

EXHAUST GAS PURIFICATION APPARATUS

CROSS-REFERENCE TO RELATED APPLICATIONS

This application claims priority to Korean Patent Application No. 10-2017-0140013, filed in the Korean Intellectual Property Office on Oct. 26, 2017, which application is hereby incorporated herein by reference.

TECHNICAL FIELD

The present invention relates to an exhaust gas purification apparatus.

BACKGROUND

Recently, according to increased usage of vehicles and increased traffic volume, air pollution due to exhaust gas comes to the fore as a serious social problem.

Therefore, governments of every country set an emission standard of pollutant in exhaust gas such as carbon monoxide (CO), hydrocarbon (HC), nitrogen oxide (NOx), and the like, in order to regulate exhaust gas. Regulations on the exhaust gas are becoming more and more strict.

Also, manufacturers of vehicles make a great efforts to effectively cope with the regulations on the exhaust gas as the regulations become more strict. An embodiment vehicle may be manufactured in accordance with an exhaust gas emission standard.

Particularly, in order to satisfy an exhaust gas emission standard, a three way catalyst converter in which a noble metal is immersed is mounted in an exhaust system of the vehicle to accelerate decomposition of hydrocarbon, oxidation of carbon monoxide, and reduction of nitrogen oxide.

Also, a gasoline vehicle conducts fuel-cut which cuts fuel injection during decrease in speed to improve fuel consumption. After finishing the fuel-cut, the three way catalyst is saturated with oxygen, so an oxygen (O2) purge is conducted to eliminate the oxygen existing on the three way catalyst.

However, the three catalyst may not temporarily reduce NOx during the O2 purge, and exhausts the flowing NOx, as it is. In other words, the exhaust gas is in a rich state during O2 purge, but the three way catalyst itself is in a lean state (oxidizing atmosphere) due to stored oxygen during fuel-cut, because oxygen storage capacity (OSC) exists in the three way catalyst. Therefore, performance of reduction in NOx is deteriorated, and the performance of the catalyst deteriorates.

The above information disclosed in this Background section is only for enhancement of understanding of the background of the invention and therefore it may contain information that does not form the prior art that is already known in this country to a person of ordinary skill in the art.

SUMMARY

The present invention provides an exhaust gas purification apparatus which has a three way catalyst including an oxygen non-storage (OSC-less) material to minimize NOx slip during oxygen purge after fuel-cut. For example, embodiments can prevent deterioration of nitrogen oxide (NOx) exhaust generating during oxygen (O2) purge of a three way catalyst after fuel-cut.

An exhaust gas purification apparatus according to an exemplary embodiment of the present invention is an exhaust gas purification apparatus for purifying exhaust gas of an engine, and includes a three way catalyst (TWC) disposed on an exhaust line through which exhaust gas exhausted from the engine passes, and transforming harmful materials such as carbon monoxide, hydrocarbon, and nitrogen oxide included in the exhaust gas to harmless materials by oxidation-reduction reaction. The three way catalyst includes a first catalyst layer, a second catalyst layer, and a third catalyst layer laminated from an upper portion on a cordierite carrier, and the first catalyst layer is formed by depositing platinum group metals (PGM) to oxygen non-storage (OSC-less) material.

The second catalyst layer is formed by depositing rhodium (Rh) or platinum (Pt) to an oxygen storage (OSC) material, and the third catalyst layer is formed by depositing Pd or Pt to alumina-based oxide or OSC material.

The platinum group metals of the first catalyst layer may include Rh, palladium (Pd), Pt, and rhodium-platinum (Rh—Pt).

The OSC-less material may include one of zirconium oxide (ZrO2), aluminum oxide (Al2O3), silicon oxide (SiO2), lanthanum oxide (La2O3), yttrium oxide (Y2O3), Perovskite, and spinel compound oxide, or a combination thereof.

The OSC-less material may have oxygen storage capacity less than 100 μmol-O2/g-cat.

The first catalyst layer may have a thickness of 2 μm to 20 μm.

The first catalyst layer may be formed on the second catalyst layer by washcoating.

The washcoating may be conducted by using one of Boehmite, alumina sol, or barium hydroxide for improving coating characteristics.

An amount of the washcoating may be 10 to 40 g/L.

An amount of the platinum group metal of the first catalyst layer may be 0.01 to 1.0 g/L.

An amount of Rh of the first catalyst layer may be 0.01 to 0.5 g/L.

An amount of Pt of the first catalyst layer may be 0.03 to 1.0 g/L.

An amount of Pd of the first catalyst layer may be 0.03 to 1.0 g/L.

An amount of Rh—Pt of the first catalyst layer may be 0.3 to 1.0 g/L, and the composition ratio thereof may be 1:5 to 5:1.

The three way catalyst may further include zeolite-based catalyst between the cordierite carrier and the third catalyst layer, which may trap hydrocarbon (HC).

The zeolite-based catalyst may include zeolite of 20 to 100 g/L.

Meanwhile, an exhaust gas purification apparatus according to an exemplary embodiment of the present invention is an exhaust gas purification apparatus for purifying exhaust gas of an engine, and includes a three way catalyst (TWC) disposed on an exhaust line through which exhaust gas exhausted from the engine passes, and transforming harmful materials such as carbon monoxide, hydrocarbon, and nitrogen oxide included in the exhaust gas to harmless materials by oxidation-reduction reaction. The three way catalyst includes a first catalyst layer, and a second catalyst layer laminated from an upper portion on a cordierite carrier. The first catalyst layer is formed by depositing platinum group metals (PGM) to oxygen non-storage (OSC-less) material.

The second catalyst layer is formed by depositing Pd to alumina-based oxide or as composition of materials formed by depositing Pd to an alumina-based oxide and depositing Rh to an OSC material.

The platinum group metals of the first catalyst layer may include Rh, Pd, Pt, and Rh—Pt.

The OSC-less material may include one of ZrO2, Al2O3, SiO2, La2O3, Y2O3, Perovskite, and spinel compound oxide or combination thereof.

The OSC-less material may have oxygen storage capacity less than 100 μmol-O2/g-cat.

The first catalyst layer may have a thickness of 2 μm to 20 μm.

According to the present invention, NOx slip generated during oxygen purge of the three way catalyst after fuel-cut is minimized, therefore performance of the three way catalyst may be improved and purification performance of the exhaust gas may be improved.

Also, the OSC-less material catalyst eliminates NOx immediately after oxygen purge, and after that, three way catalyst having conventional structure eliminates NOx, therefore unpurified NOx generated during initial oxygen purge may be effectively eliminated.

DETAILED DESCRIPTION OF ILLUSTRATIVE EMBODIMENTS

Figure 1:
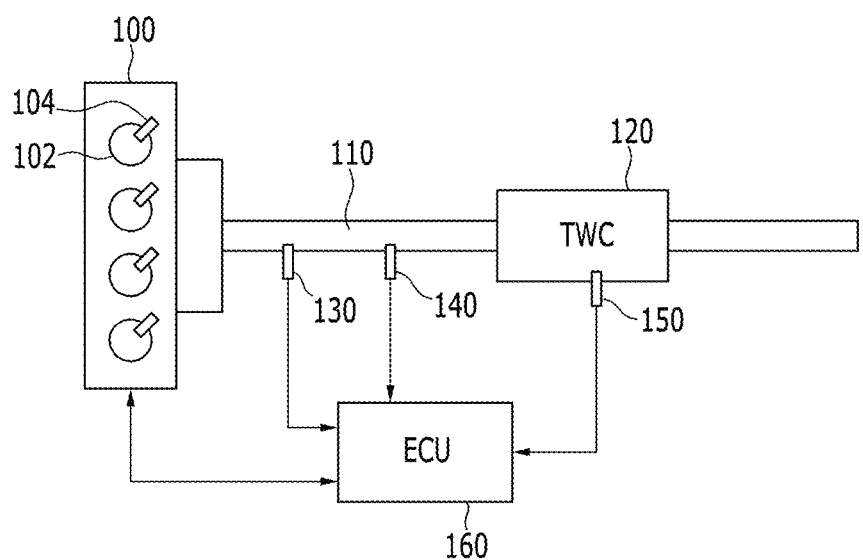
FIG. 1 is a schematic drawing illustrating an exhaust gas purification apparatus for improving three way catalyst performance according to an exemplary embodiment of the present invention.

The present invention will be described more fully hereinafter with reference to the accompanying drawings, in which exemplary embodiments of the invention are shown. The present disclosure may be modified in various different ways, and is not limited to the exemplary embodiments described herein.

Also, in exemplary embodiments, since like reference numerals designate like elements having the same configuration, a one exemplary embodiment is representatively described, and in other exemplary embodiments, only a configuration different from one exemplary embodiment will be described.

It is noted that the drawings are schematic and are not dimensionally illustrated. A relative size and a ratio of parts in the drawings may be exaggerated or reduced for clarity and convenience in the drawings and an arbitrary size is just illustrative but is not restrictive. In addition, the same reference numerals designate the same structures, elements, or parts illustrated in the two or more drawings in order to exhibit similar characteristics. It will be understood that when an element is referred to as being "on" or "over" another element, it can be directly on the other element or intervening elements may also be present.

An exemplary embodiment of the present invention specifically indicates an exemplary embodiment of the present invention. As a result, various modifications of the drawings are expected. Accordingly, the exemplary embodiment is not limited to a specific form of the illustrated region, and for example, includes a modification of a form by manufacturing.

Hereinafter, an exhaust gas purification apparatus and method for controlling the same according to an exemplary embodiment of the present invention will be described with accompanying drawings.

FIG. 1 is a schematic drawing illustrating an exhaust gas purification apparatus for improving three way catalyst performance according to an exemplary embodiment of the present invention. The exhaust gas purification apparatus illustrates only a schematic configuration that is needed to describe the exemplary embodiment of the present invention, so it is not limited to such a configuration.

Referring to FIG. 1, an exhaust gas purification apparatus according to an exemplary embodiment of the present invention includes an engine 100, a combustion chamber 102, an injector 104, an exhaust line 110, a three way catalyst (TWC) 120, a lambda sensor 130, a temperature sensor 140, an oxygen sensor 150 and a controller 160.

Outside air is supplied to the combustion chamber 102 of the engine 100, the injector 104 injects a predetermined amount of fuel to the combustion chamber 102 at a predetermined time, and the combusted exhaust gas is exhausted to outside through the three way catalyst 120 of the exhaust line 110.

The three way catalyst 120 is disposed at the exhaust line 110 which the exhaust gas exhausted from the engine 100 passes, and changes harmful materials including carbon monoxide, hydrocarbon and nitrogen oxide to harmless materials by oxidation-reduction reaction.

The lambda sensor 130 detects lambda value of the exhaust gas passing through the exhaust line 110, transmits this signal to the controller 160, and the controller 160 may control the injector 104 by using the lambda value and determine state whether or not the fuel of the injector 104 is cut.

The temperature sensor 140 is disposed at a front or rear end portion of the three way catalyst 120, measures temperature of the exhaust gas or the three way catalyst 120, and supplies the temperature information to the controller 160.

Also, the oxygen sensor 150 measures an oxygen storage capacity (hereinafter, OSC) to supply the measured oxygen storage capacity information to the controller 160. Here, it is described that the oxygen sensor 150 is disposed at the three way catalyst 120, but the oxygen sensor 150 may be disposed at a front or rear end portions, but is not limited thereto.

Meanwhile, the OSC may be measured by using a chemical adsorption method, a simulation activation evaluation device, an engine, or a vehicle, and the OSC during vehicle driving may be measured in a state that the three way catalyst is installed at the vehicle.

The controller 160 calculates heat load of the three way catalyst 120 by using information of temperature measured at the temperature sensor 140, and controls oxygen purge period by using variation amount of the OSC according to the heat load.

For this purpose, the controller 160 may be realized by at least one microprocessor operated by a predetermined program stored on a non-transitory computer readable medium, and the predetermined program may be programmed to perform respective step of method for controlling an exhaust gas purification apparatus according to an exemplary embodiment of the present invention.

Figure 2:
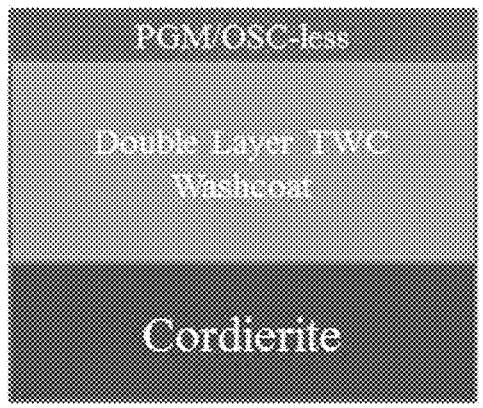
FIG. 2 is a schematic cross-sectional view illustrating a three way catalyst having a structure of three layers according to an exemplary embodiment of the present invention.
Figure 3:
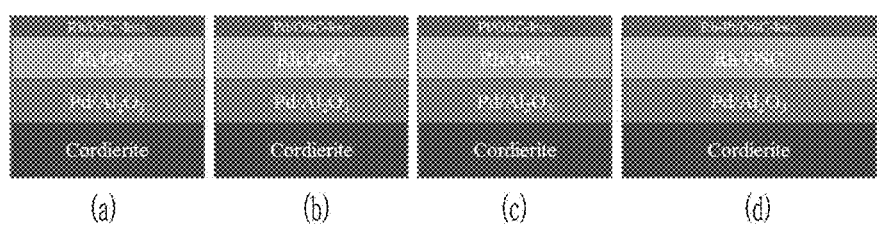
FIG. 3 is a schematic cross-sectional view illustrating an example which utmost layer of the three way catalyst includes platinum group metals according to an exemplary embodiment of the present invention.

FIG. 2 is a schematic cross-sectional view illustrating a three way catalyst having a structure of three layers according to an exemplary embodiment of the present invention, and FIG. 3 is a schematic cross-sectional view illustrating an example which utmost layer of the three way catalyst includes platinum group metals according to an exemplary embodiment of the present invention.

Referring to FIG. 2 and FIG. 3, the three way catalyst according to an exemplary embodiment of the present invention may be a structure having three layers. In other words, the three way catalyst may include a first catalyst layer, a second catalyst layer, and a third catalyst layer laminated from an upper portion on a cordierite carrier.

The first catalyst layer may be formed by depositing platinum group metals (PGM) to oxygen non-storage (OSC-less) material.

The second catalyst layer may be formed by depositing Rh or Pt to oxygen storage (OSC) material. At this time, the OSC material may be material of mixed oxide based on $CeO_2$ and Ce (for example, composite oxide which La, Pr, Nd etc. are added to $CeO_2$-$ZrO_2$) or material which Pr is added to $ZrO_2$.

Also, the third catalyst layer may be formed by depositing Pd or Pt to alumina-based oxide or OSC material. At this time, the alumina-based oxide may be composite oxide which La, Zr, Ba etc. are added to $Al_2O_3$.

The first catalyst layer may have a thickness of about 2 μm to about 20 μm, and preferably about 5 μm to about 20 μm.

In case the first catalyst layer is laminated on the second catalyst layer, NOx is purified from the exhaust gas in a rich state during initial O2 purge, and when O2 in the second catalyst layer is consumed, the second catalyst layer and the third catalyst layer eliminates NOx.

Accordingly, the exhaust gas in a rich state has to react NOx and HC/CO in the first catalyst layer. Unreacted HC/CO has to be successfully transferred to the second catalyst layer and the third catalyst layer. Therefore, O2 in the OSC material of the TWC may be reduced and the TWC may be in a normal state.

Further, after the TWC is in a normal state, contaminant in the exhaust gas has to be successfully transferred to the second catalyst layer and the third catalyst layer without disturb of the first catalyst layer to make TWC reaction.

Accordingly, the first catalyst layer may have a thickness of about 2 μm to about 20 μm, and preferably about 5 μm to about 20 μm.

If the first catalyst layer has a thickness of more than 20 μm, contaminant in the exhaust gas cannot be successfully transferred to the second catalyst layer and the third catalyst layer, therefore, performance of the exhaust gas is deteriorated after the TWC is in a normal state.

Meanwhile, amount of the platinum group metal of the first catalyst layer may be 0.01 to 1.0 g/L.

Meanwhile, the platinum group metals of the first catalyst layer may include Rh, Pd, Pt, and Rh—Pt.

As shown in FIG. 3(*a*), the first catalyst layer may be formed by depositing Rh to oxygen non-storage (OSC-less) material. At this time, amount of Rh may be about 0.01 to 0.5 g/L.

Also, as shown in FIG. 3(*b*), the first catalyst layer may be formed by depositing Pd to oxygen non-storage (OSC-less) material. At this time, amount of Pd may be about 0.03 to 1.0 g/L.

Also, as shown in FIG. 3(*c*), the first catalyst layer may be formed by depositing Pt to oxygen non-storage (OSC-less) material. At this time, amount of Pt may be about 0.03 to 1.0 g/L.

Also, as shown in FIG. 3(*d*), the first catalyst layer may be formed by depositing Rh—Pt to oxygen non-storage (OSC-less) material. At this time, amount of Rh—Pt may be about 0.03 to 1.0 g/L, and the composition ratio thereof may be about 1:5 to 5:1.

Meanwhile, the OSC-less material may include one of $ZrO_2$, $Al_2O_3$, $SiO_2$, $La_2O_3$, $Y_2O_3$, Perovskite, and spinel compound oxide or combination thereof.

At this time, the OSC-less material may have oxygen storage capacity less than about 100 μmol-O2/g-cat, preferably about 500 μmol-O2/g-cat.

In FIG. 3, examples which the second catalyst layer is formed by depositing Rh to the OSC material, the third catalyst layer is formed by depositing Pd to alumina-based oxide are illustrated, however, the second catalyst layer may be formed by depositing Pt to the OSC material, the third catalyst layer may be formed by depositing Pd to the OSC material or depositing Pt to the alumina-based oxide or the OSC material.

Meanwhile, the first catalyst layer may be formed on the second catalyst layer by washcoating.

At this time, the washcoating may be conducted by using one of Boehmite, alumina sol, barium hydroxide for improving coating characteristic.

Also, amount of the washcoating may be about 10 to 40 g/L.

In the present invention, NOx slip immediately after oxygen purge after fuel-cut may be reduced by forming the first catalyst layer which is formed by depositing platinum group metals to the OSC-less material by washcoating. The first catalyst layer eliminates NOx by reaction of NOx, HC, and CO in the exhaust gas in a rich state in the beginning, then unreacted HC and CO are delivered to the second catalyst layer and the third catalyst layer under the first catalyst layer.

Since the HC and CO have to be delivered to the lower part of the first catalyst layer, the first catalyst layer may be formed on the second catalyst layer by washcoating as a thickness of about 2 μm to about 20 μm, preferably about 5 μm to about 10 μm.

Figure 4:
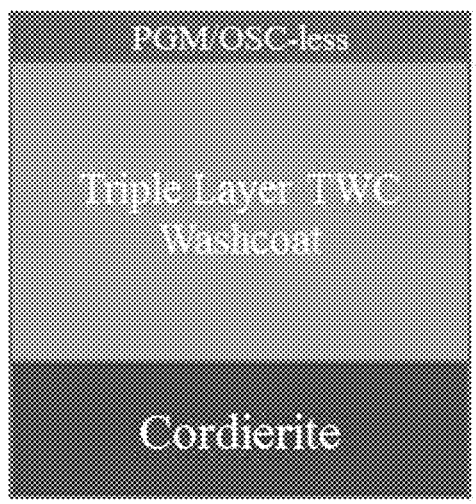
FIG. 4 is a schematic cross-sectional view illustrating a three way catalyst having a structure of four layers according to an exemplary embodiment of the present invention.
Figure 5:
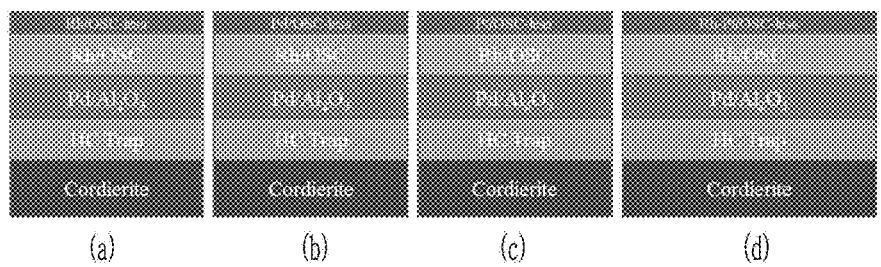
FIG. 5 is a schematic cross-sectional view illustrating an example which utmost layer of the three way catalyst includes platinum group metals according to an exemplary embodiment of the present invention.

FIG. 4 is a schematic cross-sectional view illustrating a three way catalyst having a structure of four layers according to an exemplary embodiment of the present invention, and FIG. 5 is a schematic cross-sectional view illustrating an example which utmost layer of the three way catalyst includes platinum group metals according to an exemplary embodiment of the present invention.

Referring to FIG. 4 and FIG. 5, the three way catalyst may further include zeolite-based catalyst between the cordierite carrier and the third catalyst layer, which may trap hydrocarbon (HC).

The zeolite-based catalyst may include zeolite of about 20 to 100 g/L.

As shown in FIG. 5(*a*) to FIG. 5(*d*), the first catalyst layer may be formed by depositing platinum group metals (PGM)

such as Rh, Pd, Pt, and Rh—Pt to oxygen non-storage (OSC-less) material, the second catalyst layer may be formed by depositing Rh to oxygen storage (OSC) material, the third catalyst layer may be formed by depositing Pd to alumina-based oxide material, and zeolite-based catalyst may be disposed on the cordierite carrier.

In FIG. 5, examples which the second catalyst layer is formed by depositing Rh to the OSC material, the third catalyst layer is formed by depositing Pd to alumina-based oxide are illustrated, however, the second catalyst layer may be formed by depositing Pt to the OSC material, the third catalyst layer may be formed by depositing Pd to the OSC material or depositing Pt to the alumina-based oxide or the OSC material.

Figure 6:
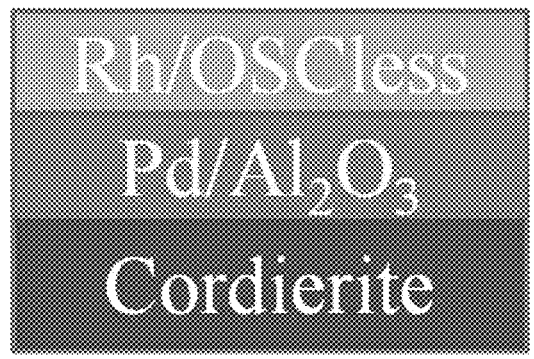
FIG. 6 is a schematic cross-sectional view illustrating an example which a second catalyst layer of the three way catalyst having a structure of two layers is formed by depositing Pd to alumina-based oxide.
Figure 7:
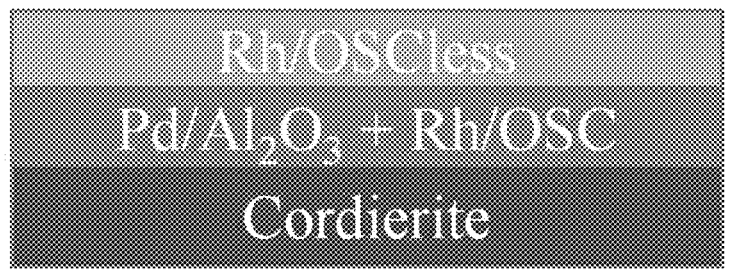
FIG. 7 is a schematic cross-sectional view illustrating an example which a second catalyst layer of the three way catalyst having a structure of two layers is formed as composition of materials formed by depositing Pd to alumina-based oxide and Rh to OSC material.

Meanwhile, a three way catalyst according to an exemplary embodiment of the present invention may be a structure having two layers. FIG. 6 is a schematic cross-sectional view illustrating an example which a second catalyst layer of the three way catalyst having a structure of two layers is formed by depositing Pd to alumina-based oxide, and FIG. 7 is a schematic cross-sectional view illustrating an example which a second catalyst layer of the three way catalyst having a structure of two layers is formed as composition of materials formed by depositing Pd to alumina-based oxide and Rh to OSC material.

As shown in FIG. 6, the three way catalyst may include a first catalyst layer, a second catalyst layer, and a third catalyst layer laminated from an upper portion on a cordierite carrier, and The first catalyst layer may be formed by depositing platinum group metals (PGM) to oxygen non-storage (OSC-less) material. Also, the second catalyst layer may be formed by depositing Pd to alumina-based oxide.

At this time, the platinum group metals of the first catalyst layer may include Rh, Pd, Pt, and Rh—Pt. Also, the OSC-less material may include one of ZrO2, Al2O3, SiO2, La2O3, Y2O3, Perovskite, and spinel compound oxide or combination thereof.

The OSC-less material may have oxygen storage capacity less than about 100 μmol-O2/g-cat, preferably about 50 μmol-O2/g-cat. Also, the first catalyst layer may have a thickness of about 20 μm to about 100 μm.

Also, as shown in FIG. 7, the second catalyst layer may be formed as composition of materials formed by depositing Pd to alumina-based oxide and Rh to OSC material.

Meanwhile, the structure of the three way catalyst described above may be applied to a structure of MCC (Manifolder Catalytic Converter), WCC (Warm Up Catalytic Converter), CCC (Closed Coupled Catalytic Converter), and UCC (Under Floor Catalytic Converter) according to install position, it is preferable to be applied as MCC, WCC, and CCC which are closer to the engine rather than UCC which is remote from the engine.

Like this, in the exhaust gas purification apparatus according to an exemplary embodiment of the present invention, NOx slip generated during oxygen purge of the three way catalyst after fuel-cut is minimized, therefore performance of the three way catalyst may be improved and purification performance of the exhaust gas may be improved.

Also, the OSC-less material catalyst eliminates NOx immediately after oxygen purge, and after that, three way catalyst having conventional structure eliminates NOx, therefore unpurified NOx generated during initial oxygen purge may be effectively eliminated.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An engine exhaust gas purification apparatus, comprising:
   a three way catalyst (TWC) disposed on an exhaust line through which exhaust gas is exhausted from an engine passes, wherein the TWC is configured to transform harmful materials including at least one of carbon monoxide, hydrocarbon, or nitrogen oxide that is included in the exhaust gas to harmless materials by an oxidation-reduction reaction;
   wherein the three way catalyst includes a first catalyst layer, a second catalyst layer, and a third catalyst layer laminated from an upper portion on a cordierite carrier; and
   wherein the first catalyst layer comprises at least one platinum group metal (PGM) and further comprises an oxygen non-storage (OSC-less) material,
   wherein the first catalyst layer is formed on the second catalyst layer by washcoating;
   wherein the washcoating is conducted by using one of Boehmite or barium hydroxide; and
   wherein an amount of the washcoating is 10 to 40 g/L.

2. The engine exhaust gas purification apparatus of claim 1, wherein the second catalyst layer comprises at least one of rhodium (Rh) or platinum (Pt) and further comprises an oxygen storage (OSC) material; and
   wherein the third catalyst layer comprises at least one of palladium (Pd) or Pt and further comprises at least one of alumina-based oxide or OSC material.

3. The engine exhaust gas purification apparatus of claim 1, wherein the at least one platinum group metal of the first catalyst layer comprises at least one of Rh, Pd, Pt, or rhodium-platinum (Rh—Pt).

4. The engine exhaust gas purification apparatus of claim 3, wherein an amount of the at least one platinum group metal of the first catalyst layer is 0.01 to 1.0 g/L.

5. The engine exhaust gas purification apparatus of claim 4, wherein an amount of Rh of the first catalyst layer is 0.01 to 0.5 g/L.

6. The engine exhaust gas purification apparatus of claim 4, wherein an amount of Pt of the first catalyst layer is 0.03 to 1.0 g/L.

7. The engine exhaust gas purification apparatus of claim 4, wherein and amount of Pd of the first catalyst layer is 0.03 to 1.0 g/L.

8. The engine exhaust gas purification apparatus of claim 4, wherein an amount of Rh—Pt of the first catalyst layer is 0.3 to 1.0 g/L, and wherein a composition ratio thereof is 1:5 to 5:1.

9. The engine exhaust gas purification apparatus of claim 1, wherein the OSC-less material comprises one of zirconium oxide (ZrO2), aluminum oxide (Al2O3), silicon oxide (SiO2), lanthanum oxide (La2O3), yttrium oxide (Y2O3), Perovskite, spinel compound oxide, or a combination thereof.

10. The engine exhaust gas purification apparatus of claim 1, wherein the OSC-less material has an oxygen storage capacity less than 100 μmol-O2/g-cat.

11. The engine exhaust gas purification apparatus of claim 1, wherein the first catalyst layer has a thickness of 2 μm to 20 μm.

12. The engine exhaust gas purification apparatus of claim 1, wherein the three way catalyst further includes zeolite-based catalyst between the cordierite carrier and the third catalyst layer, wherein the zeolite-based catalyst is configured to trap hydrocarbon (HC).

13. The engine exhaust gas purification apparatus of claim 12, wherein the zeolite-based catalyst includes an amount of zeolite that is 20 to 100 g/L.

14. An engine exhaust gas purification apparatus, comprising:
   a three way catalyst (TWC) disposed on an exhaust line through which exhaust gas is exhausted from an engine passes, wherein the TWC is configured to transform harmful materials including at least one of carbon monoxide, hydrocarbon, or nitrogen oxide that is included in the exhaust gas to harmless materials by an oxidation-reduction reaction;
   wherein the three way catalyst includes a first catalyst layer, and a second catalyst layer laminated from an upper portion on a cordierite carrier, and
   wherein the first catalyst layer comprises at least one platinum group metal (PGM) and further comprises an oxygen non-storage (OSC-less) material;
   wherein the first catalyst layer is formed on the second catalyst layer by washcoating;
   wherein the washcoating is conducted by using one of Boehmite or barium hydroxide; and
   wherein an amount of the washcoating is 10 to 40 g/L.

15. The engine exhaust gas purification apparatus of claim 14, wherein the second catalyst layer comprises one of palladium (Pd) deposited on an alumina-based oxide or a composition of materials comprising Pd deposited on an alumina-based oxide and rhodium (Rh) deposited on an OSC material.

16. The engine exhaust gas purification apparatus of claim 14, wherein the at least one platinum group metal of the first catalyst layer comprises at least one of Rh, Pd, platinum (Pt), and rhodium platinum (Rh—Pt).

17. The engine exhaust gas purification apparatus of claim 14, wherein the OSC-less material comprises one of zirconium oxide ($ZrO_2$), aluminum oxide ($Al_2O_3$), silicon oxide ($SiO_2$), lanthanum oxide ($La_2O_3$), yttrium oxide ($Y_2O_3$), Perovskite, spinel compound oxide, or a combination thereof.

18. The engine exhaust gas purification apparatus of claim 14, wherein the OSC-less material has oxygen storage capacity less than 100 μmol-$O_2$/g-cat.

19. The engine exhaust gas purification apparatus of claim 14, wherein the first catalyst layer has a thickness of 2 μm to 20 μm.

20. A method for forming an engine exhaust gas purification apparatus, the method comprising:
   providing a three way catalyst (TWC) configured to receive exhaust gas passing through an exhaust line from an engine, wherein the TWC is configured to transform harmful materials including at least one of carbon monoxide, hydrocarbon, or nitrogen oxide that is included in the exhaust gas to harmless materials by an oxidation-reduction reaction, and wherein the three way catalyst includes a first catalyst layer, a second catalyst layer, and a third catalyst layer laminated from an upper portion on a cordierite carrier, wherein the first catalyst layer comprises at least one platinum group metal (PGM) and further comprises an oxygen non-storage (OSC-less) material;
   wherein the providing the TWC comprises forming first catalyst layer on the second catalyst layer by washcoating, wherein the washcoating is conducted by using one of Boehmite or barium hydroxide, and wherein an amount of the washcoating is 10 to 40 g/L.

21. The method of claim 20, wherein the at least one platinum group metal of the first catalyst layer comprises at least one of Rh, Pd, Pt, or rhodium-platinum (Rh—Pt).

22. The method of claim 20, wherein the OSC-less material comprises one of zirconium oxide ($ZrO_2$), aluminum oxide ($Al_2O_3$), silicon oxide ($SiO_2$), lanthanum oxide ($La_2O_3$), yttrium oxide ($Y_2O_3$), Perovskite, spinel compound oxide, or a combination thereof.

* * * * *